US012632714B1

(12) United States Patent
Amirineni et al.

(10) Patent No.: US 12,632,714 B1
(45) Date of Patent: May 19, 2026

(54) INTERCONNECT MODE FOR COMPUTATIONAL ARRAYS

(71) Applicant: Amazon Technologies, Inc., Seattle, WA (US)

(72) Inventors: Sundeep Amirineni, Cedar Park, TX (US); Paul Gilbert Meyer, Jericho, VT (US); Ron Diamant, San Jose, CA (US); Qingrui Liu, Burlingame, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1146 days.

(21) Appl. No.: 17/453,293

(22) Filed: Nov. 2, 2021

(51) Int. Cl.
*G06F 7/78* (2006.01)
*G06F 12/0802* (2016.01)
*G06F 17/16* (2006.01)
*G06N 3/063* (2023.01)

(52) U.S. Cl.
CPC .............. *G06N 3/063* (2013.01); *G06F 7/78* (2013.01); *G06F 12/0802* (2013.01); *G06F 17/16* (2013.01)

(58) Field of Classification Search
CPC ....... G06N 3/063; G06F 7/78; G06F 12/0802; G06F 17/16
See application file for complete search history.

(56) References Cited

U.S. PATENT DOCUMENTS

| | | | |
|---|---|---|---|
| 4,760,543 | A | 7/1988 | Ligtenberg et al. |
| 5,321,639 | A | 6/1994 | Krishnamoorthy et al. |
| 5,842,035 | A | 11/1998 | Nishikawa |
| 6,167,502 | A * | 12/2000 | Pechanek ............ G06F 15/8023 712/15 |
| 6,438,747 | B1 | 8/2002 | Schreiber et al. |
| 6,675,187 | B1 | 1/2004 | Greenberger |
| 6,754,687 | B1 | 6/2004 | Kurak, Jr. et al. |
| 7,596,678 | B2 | 9/2009 | Beaumont |
| 8,327,114 | B1 * | 12/2012 | Cismas ............... G06F 11/1423 712/16 |
| 8,473,540 | B1 | 6/2013 | Rao et al. |
| 10,489,479 | B1 * | 11/2019 | Shalev ................... G06F 17/12 |

(Continued)

OTHER PUBLICATIONS

Torbjorn Viem Ness; Low Power Floating Point Unit for RISC-V; Jul. 2018; Norwegian University of Science & Technology; Whole document. (Year: 2018).*

(Continued)

*Primary Examiner* — Phenuel S Salomon
(74) *Attorney, Agent, or Firm* — Weaver Austin Villeneuve & Sampson LLP

(57) ABSTRACT

A processing engine array is provided with an interconnect mode of operation to use the array as an interconnect to move data elements to different locations in memory such as to perform a matrix transpose operation. In this interconnect mode of operation, although computations are still being (Continued)

600 performed in the array, the computations are not carried out to modify or change the values of the data elements, but are instead carried out to rearrange the data elements in memory. As such, the computations carried out in the interconnect mode of operation can deviate from the expected behavior of floating-point calculations. A mode selection signal can be used to provide the proper outputs of the processing elements of the array depending on the mode of operation.

18 Claims, 11 Drawing Sheets

(56) References Cited

U.S. PATENT DOCUMENTS

| | | | |
|---|---|---|---|
| 10,884,707 | B1 | 1/2021 | Li et al. |
| 11,036,827 | B1 | 6/2021 | Zejda et al. |
| 2009/0063529 | A1 | 3/2009 | Gustavson et al. |
| 2010/0211337 | A1* | 8/2010 | Clark .................. G01R 33/022 |
| | | | 703/2 |
| 2011/0119467 | A1 | 5/2011 | Cadambi et al. |
| 2011/0161625 | A1 | 6/2011 | Pechanek |
| 2013/0103925 | A1 | 4/2013 | Meeker |
| 2015/0169369 | A1* | 6/2015 | Baskaran ............. G06F 9/4881 |
| | | | 718/102 |
| 2016/0020824 | A1 | 1/2016 | Ulrich et al. |
| 2017/0168991 | A1* | 6/2017 | Baskaran ................ G06F 17/16 |
| 2017/0200094 | A1* | 7/2017 | Bruestle ................... G06F 5/01 |
| 2018/0260690 | A1* | 9/2018 | Young ...................... G06N 3/04 |
| 2018/0314671 | A1 | 11/2018 | Zhang et al. |
| 2019/0205787 | A1* | 7/2019 | Duriseti ................ G06F 16/901 |
| 2021/0096823 | A1 | 4/2021 | Li et al. |

OTHER PUBLICATIONS

Baker, K., "Singular Value Decomposition Tutorial", kbaker@ling. osu.edu, Mar. 19, 2005, pp. 1-24.

Johnson, J. R., et al., "A Methodology for Designing, Modifying, and Implementing Fourier Transform Algorithms on Various Architectures", *Circuits, Systems and Signal Processing*, vol. 9, No. 4, pp. 449-500, 1990.

Lin, Jui-Chieh, et al., "Bit Matrix Transpose with Tensor Product and Perfect Shuffling", *Proc. 2013 IEEE Workshop on Signal Processing Systems(SiPS 2013)*, pp. 389-394, 2013.

O'Leary, Dianne P., "Systolic Arrays for Matrix Transpose and Other Reorderings", *IEEE Transactions on Computers*, vol. C-36, No. 1, pp. 117-122, Jan. 1987.

Srivastava, Nitish, et al., "T2S-Tensor: Productively Generating High-Performance Spatial Hardware for Dense Tensor Computations", *Proc. 2019 IEEE 27th Annual International Symposium on Field-Programmable Custom Computing Machines(FCCM)*, pp. 181-189, Apr. 28, 2019.

Zekri, Ahmed S., "Restructuring and Implementations of 2D Matrix Transpose Algorithm Using SSE4 Vector Instructions", *Proc. 2015 International Conference on Applied Research in Computer Science and Engineering(ICAR)*, pp. 1-7, 2015.

* cited by examiner

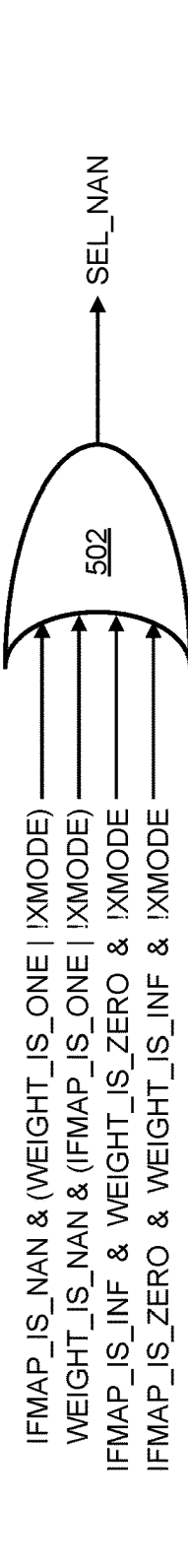
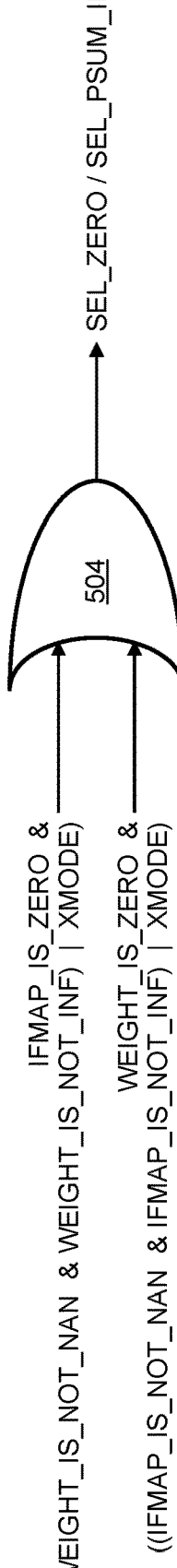
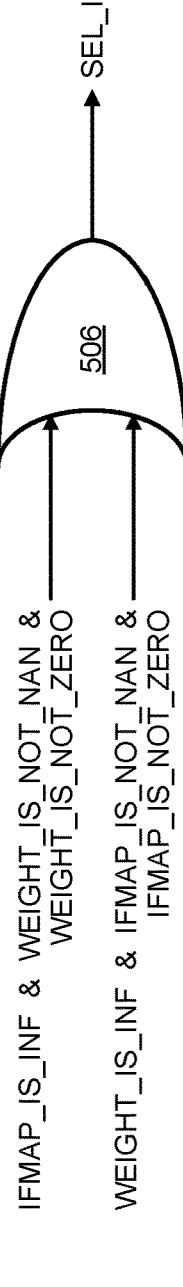
FIG. 5

600

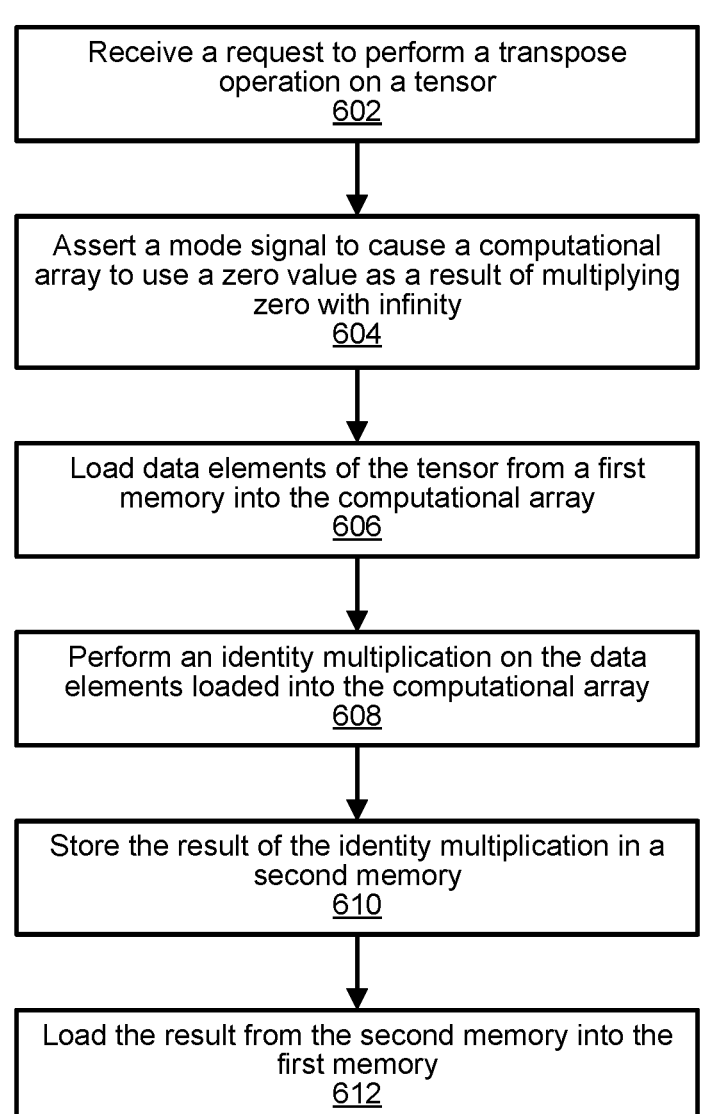

Receive a request to perform a transpose operation on a tensor
602

Assert a mode signal to cause a computational array to use a zero value as a result of multiplying zero with infinity
604

Load data elements of the tensor from a first memory into the computational array
606

Perform an identity multiplication on the data elements loaded into the computational array
608

Store the result of the identity multiplication in a second memory
610

Load the result from the second memory into the first memory
612

FIG. 6

INTERCONNECT MODE FOR COMPUTATIONAL ARRAYS

BACKGROUND

An accelerator is an integrated circuit device optimized for performing computations (e.g., neural network computations), that may otherwise be performed by a general-purpose processor. Data stored in a main memory of a computing system is copied, or mapped, into memory locations within the accelerator to enable faster access to the data for performing calculations by execution engines of the accelerator. In some cases, based on the calculations to be performed by execution engines, the architecture of the accelerator can be leveraged to improve calculation speeds.

BRIEF DESCRIPTION OF THE DRAWINGS

Various embodiments in accordance with the present disclosure will be described with reference to the drawings, in which:

FIG. 5 illustrates a block diagram of an example of logic circuitry to generate selection signals;

FIG. 6 illustrates a flow diagram of an example of a process for transposing data elements;

DETAILED DESCRIPTION

Figure 1:
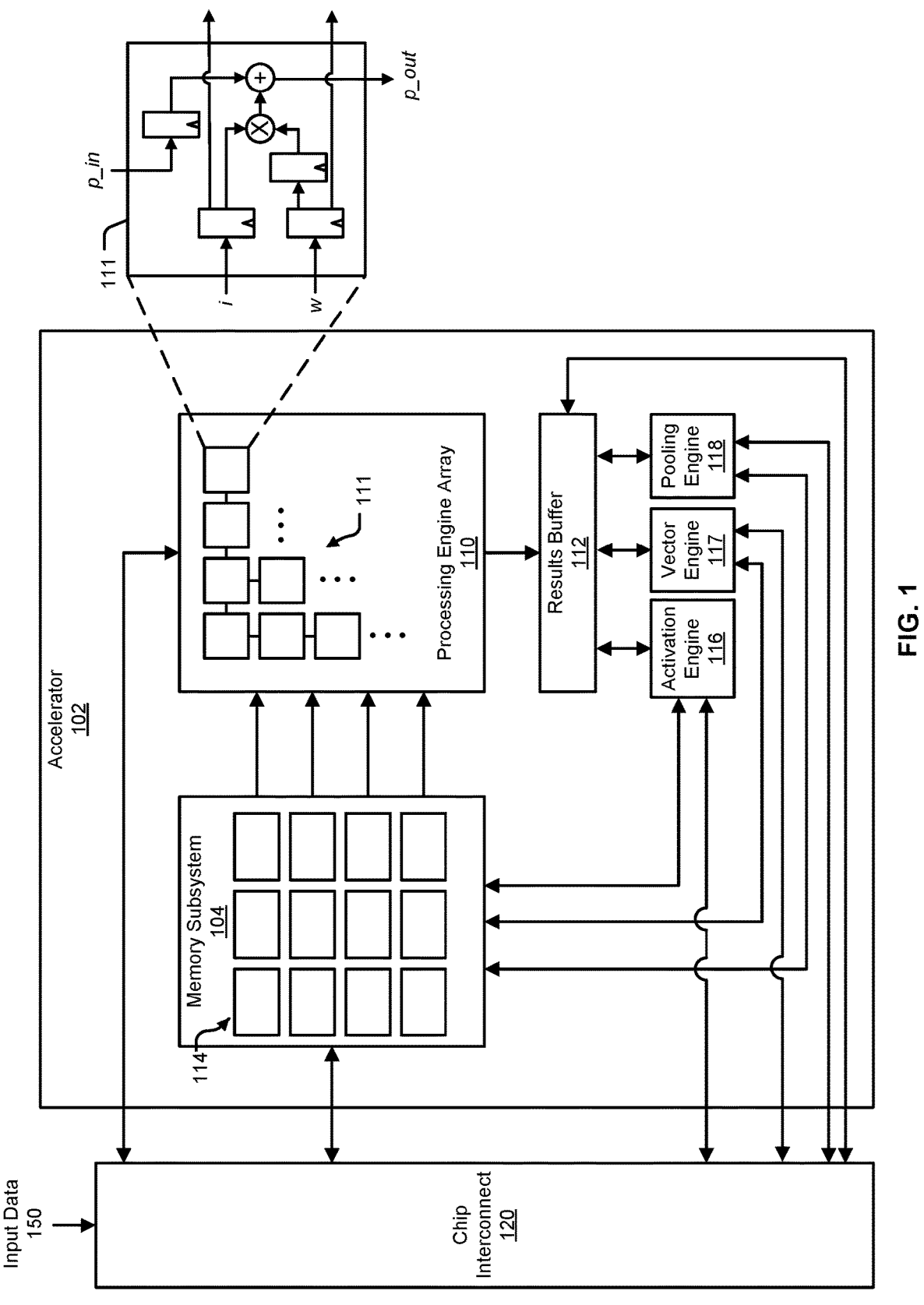
FIG. 1 illustrates a block diagram of an example of an integrated circuit device.

An acceleration engine can include one or more accelerators to execute computations using a computational array such as a processing engine array. The processing engine array has processing engines (may also be referred to as processing elements) arranged in rows and columns to perform complex computations such as matrix multiply computations or other computations. The accelerator may also include a buffer memory system. The buffer memory system may include one or more buffer memories that stores data, for example, neural network weights and feature map input data to be processed by the processing engine array, as well as intermediate and/or final results of computations performed by the processing engine array.

For various computations, data in the form of a tensor may be retrieved from host memory (e.g., dynamic random-access memory (DRAM)) and stored in the buffer memory system. In practical applications, the number of data elements in a tensor can be much greater than the number of data elements that the buffer memory system can store at one time and/or that a processing engine array is capable of processing at one time. Thus, the tensor may be decomposed into multiple blocks of data elements of appropriate size to be stored in the buffer memory system. Further, the number of data elements of the decomposed tensor stored in the buffer memory system may be too large for the PE array to process at one time. Therefore, the block of data elements stored in the buffer memory system can be further decomposed to enable processing by the processing engine array.

In some cases, depending on the computations being performed, the way the tensor is arranged or mapped in a buffer memory can be modified to facilitate the computations. For example, in the case of performing a matrix multiplication on weights and inputs of different matrix sizes, a matrix transpose operation can be performed to carry out the computation. One way to perform a matrix transpose operation is to copy the data elements of the matrix from the buffer memory into a host memory (e.g., DRAM), and then write the data elements from the host memory back into the buffer memory at the transposed locations. However, such a technique can incur significant memory access latencies, and may take up host processor cycles that can otherwise be used for other tasks. To reduce the latency when performing computations that involve moving data elements such as a matrix transpose operation, the architecture of the processing engine array can be leveraged to perform the matrix transpose operation without requiring the matrix data to be written to and read from the host memory by using the processing engine array as an interconnect between the buffer memories of the accelerator.

In some scenarios, utilizing the processing engine array to transpose the matrix data may cause certain data elements to be overwritten unintentionally due to the nature of handling floating-point calculations. By way of example, certain implementations of the processing engine array can be designed to perform floating-point calculations according to the Institute of Electrical and Electronics Engineers (IEEE) 754 standard for floating-point arithmetic. Under the IEEE 754 standard, multiplying zero with infinity results in a not-a-number (NaN) value to indicate that the result is undefined. Hence, the intended behavior when using the processing engine array to perform floating-point calculations is to generate a NaN value when multiplying zero with infinity. However, when using the processing engine array as an interconnect to transpose data elements of a matrix, the intended behavior when multiplying zero with infinity is to produce zero as a result, and generating a NaN value in such scenarios may cause certain data elements to be overwritten with erroneous values.

The techniques disclosed herein provide a mode of operation for a processing engine array to use the array as an interconnect to move data elements to different locations in memory. In this interconnect mode of operation, although computations are still being performed in the array, the computations are not carried out to modify or change the values of the data elements, but are instead carried out to rearrange the data elements in memory. As such, the computations carried out in the interconnect mode of operation can deviate from the expected behavior of floating-point calculations. For example, instead of generating a NaN value when multiplying zero with infinity as in normal floating-point calculations, multiplying zero with infinity in the interconnect mode of operation would generate a zero as the multiplication result. In some implementations, to switch between the interconnect mode of operation and a compute mode of operation to perform floating-point calculations, a mode signal can be used to configure the array in the intended mode of operation. The mode signal can be generated based on the particular instruction that the processing engine array is executing, and the mode of operation can be dynamically switched between the interconnect mode and the compute mode on a per instruction basis.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 is a block diagram illustrating an example of an integrated circuit device that can include an accelerator 102. In various examples, the accelerator 102, for a set of input data (e.g., input data 150), can execute computations using various compute engines such as a processing engine array 110, an activation engine 116, a vector engine 117, and/or a pooling engine 118. In some examples, accelerator 102 can be an integrated circuit component of a processor, such as a neural network processor. The processor may have other integrated circuit components, including additional accelerator engines.

In various implementations, the memory subsystem 104 (may also be referred to as a state buffer) can include multiple memory banks 114. In these implementations, each memory bank 114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 104 can permit simultaneous access to the read or write channels of multiple memory banks. As another example, the memory subsystem 104 can include arbitration logic such that arbitration between, for example, the outputs of multiple memory banks 114 can result in more than one memory bank's output being used. In these and other examples, though globally managed by the memory subsystem 104, each memory bank can be operated independently of any other.

Having the memory banks 114 be independently accessible can increase the efficiency of the accelerator 102. For example, values can be simultaneously read and provided to each row of the processing engine array 110, so that the entire processing engine array 110 can be in use in one clock cycle. As another example, the memory banks 114 can be read at the same time that results computed by the processing engine array 110 are written to the memory subsystem 104. In contrast, a single memory may be able to service only one read or write at a time. With a single memory, multiple clock cycles can be required, for example, to read input data for each row of the processing engine array 110 before the processing engine array 110 can be started.

In various implementations, the memory subsystem 104 can be configured to simultaneously service multiple clients, including the processing engine array 110, the activation engine 116, the vector engine 117, the pooling engine 118, and any external clients that access the memory subsystem 104 over a communication fabric 120. In some implementations, being able to service multiple clients can mean that the memory subsystem 104 has at least as many memory banks as there are clients. In some cases, each row of the processing engine array 110 can count as a separate client. In some cases, each column of the processing engine array 110 can output a result, such that each column can count as a separate write client. In some cases, output from the processing engine array 110 can be written into the memory banks 114 that can then subsequently provide input data for the processing engine array 110. As another example, the activation engine 116, the vector engine 117, and the pooling engine 118 can include multiple execution (may also be referred to as computational channels), each of which can be separate memory clients. The memory banks 114 can be implemented, for example, using static random access memory (SRAM).

In various implementations, the memory subsystem 104 can include control logic. The control logic can, for example, keep track of the address spaces of each of the memory banks 114, identify memory banks 114 to read from or write to, and/or move data between the memory banks 114. In some implementations, memory banks 114 can be hardwired to particular clients. For example, a set of memory banks 114 can be hardwired to provide values to the rows of the processing engine array 110, with one memory bank servicing each row. As another example, a set of memory banks can be hard wired to receive values from columns of the processing engine array 110, with one memory bank receiving data for each column.

The processing engine array 110 is the computation matrix of the example accelerator 102. The processing engine array 110 can, for example, execute parallel integration, convolution, correlation, and/or matrix multiplication, among other things. The processing engine array 110 includes multiple processing engines 111 (may also be referred to as processing elements) arranged in rows and columns, such that results output by one processing engine 111 can be input directly into another processing engine 111. Processing engines 111 that are not on the outside edges of the processing engine array 110 thus can receive data to operate on from other processing engines 111, rather than from the memory subsystem 104.

In various examples, the processing engine array 110 uses systolic execution, in which data arrives at each processing engine 111 from different directions at regular intervals. In some examples, input data can flow into the processing engine array 110 from the left and weight values can be loaded at the top. In some examples weights and input data can flow from the left and partial sums can flow from top to bottom. In these and other examples, a multiply-and-accumulate operation moves through the processing engine array 110 as a diagonal wave front, with data moving to the right and down across the array. Control signals can be input at the left at the same time as weights, and can flow across and down along with the computation.

In various implementations, the number of columns in the processing engine array 110 determines the computational capacity of the processing engine array 110, and the number of rows determines the required memory bandwidth for achieving maximum utilization of the processing engine array 110. The processing engine array 110 can have, for example, 64 columns and 128 rows, or some other number of columns and rows.

An example of a processing engine 111 is illustrated in FIG. 1 in an inset diagram. As illustrated by this example, a processing engine 111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 111.

In the illustrated example, an input from above can include a partial sum input, p_in, provided either from another processing engine 111 or from a previous round of computation by the processing engine array 110. When starting a computation for a new set of input data, the top row of the processing engine array 110 can receive a fixed value for p_in, such as zero. As illustrated by this example, i (e.g., feature map input value) and w (weight value) are multiplied together and the result is summed with p_in to produce a new partial sum output, p_out, which can be input into another processing engine 111. Various other implementations of the processing engine 111 are possible.

Outputs from the last row in the processing engine array 110 can be temporarily stored in the results buffer 112. The results can be intermediate results, which can be written to the memory banks 114 to be provided to the processing engine array 110 for additional computation. Alternatively, the results can be final results, which, once written to the memory banks 114 can be read from the memory subsystem 104 over the communication fabric 120, to be output by the system.

In some implementations, the accelerator 102 includes an activation engine 116. In these implementations, the activation engine 116 can combine the results from the processing engine array 110 into one or more output activations. For example, for a convolutional neural network, convolutions from multiple channels can be summed to produce an output activation for a single channel. In other examples, accumulating results from one or more columns in the processing engine array 110 may be needed to produce an output activation for a single node in the neural network. In some examples, activation engine 116 can be bypassed.

In various examples, the activation engine 116 can include multiple separate execution channels. In these examples, the execution channels can correspond to the columns of the processing engine array 110, and can perform an operation on the outputs of a column, the result of which can be stored in the memory subsystem 104. In these examples, the activation engine 116 may be able to perform between 1 and n parallel computations, where n is equal to the number of columns in the processing engine array 110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 102 can include a pooling engine 118. Pooling is the combining of outputs of the columns of the processing engine array 110. Combining can include for example, computing a maximum value, a minimum value, an average value, a median value, a summation, a multiplication, or another logical or mathematical combination. In various examples, the pooling engine 118 can include multiple execution channels that can operating on values from corresponding columns of the processing engine array 110. In these examples, the pooling engine 118 may be able to perform between 1 and n parallel computations, where n is equal to the number of columns in the processing engine array 110. In various examples, execution channels of the pooling engine 118 can operate in parallel and/or simultaneously. In some examples, the pooling engine 118 can be bypassed.

In some implementations, the accelerator 102 can further include a vector engine 117. Vector engine 117 is a compute engine that can perform computations and manipulations on values stored in memory subsystem 104 and/or results buffer 112 such as values representing matrices of input values, weight values, intermediate results, etc. Vector engine 117 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 117 can operate in parallel and/or simultaneously. In some examples, the vector engine 117 can be bypassed or be omitted.

Herein, the activation engine 116, the vector engine 117, and the pooling engine 118 may be referred to collectively as execution engines. The processing engine array 110 is another example of an execution engine. Another example of an execution engine is a Direct Memory Access (DMA) engine, which may be located outside the accelerator 102.

Input data 150 can arrive over the communication fabric 120. The communication fabric 120 can connect the accelerator 102 to other components of a processor, such as a DMA engine that can obtain input data 150 from an Input/Output (I/O) device, a storage drive, or a network interface. The input data 150 can be, for example one-dimensional data, such as a character string or numerical sequence, or two-dimensional data, such as an array of pixel values for an image or frequency and amplitude values over time for an audio signal. In some examples, the input data 150 can be three-dimensional, as may be the case with, for example, the situational information used by a self-driving car or virtual reality data. In some implementations, the memory subsystem 104 can include a separate buffer for the input data 150. In some implementations, the input data 150 can be stored in the memory banks 114 when the accelerator 102 receives the input data 150.

In some examples, the accelerator 102 can implement a neural network processing engine. In these examples, the accelerator 102, for a set of input data 150, can execute a neural network to perform a task for which the neural network was trained. Executing a neural network on a set of input data can be referred to as inference or performing inference.

The weights for the neural network can be stored in the memory subsystem 104, along with input data 150 on which the neural network will operate. The neural network can also include instructions, which can program the processing engine array 110 to perform various computations on the weights and the input data. The instructions can also be stored in the memory subsystem 104, in the memory banks 114 or in a separate instruction buffer. The processing engine array 110 can output intermediate results, which represent the outputs of individual layers of the neural network. In some cases, the activation engine 116, the vector engine 117, and/or pooling engine 118 may be enabled for computations called for by certain layers of the neural network. The accelerator 102 can store the intermediate results in the memory subsystem 104 for inputting into the processing engine array 110 to compute results for the next layer of the neural network. The processing engine array 110 can further output final results from a last layer of the neural network. The final results can be stored in the memory subsystem 104 and then be copied out to host processor memory or to another location.

Figure 2A:
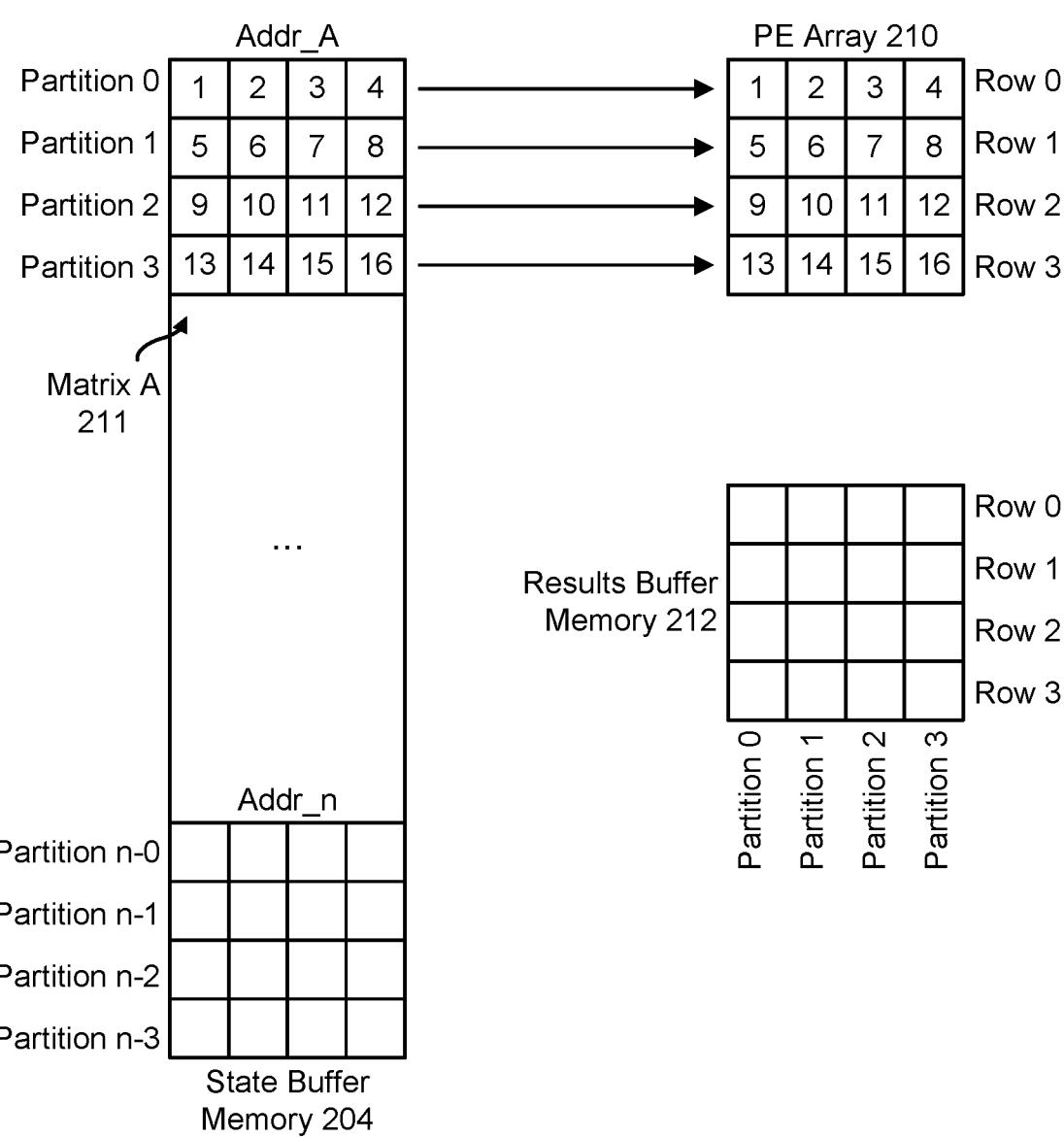
FIG. 2A illustrates a conceptual diagram of an example of operations to transpose a tensor.
Figure 2B:
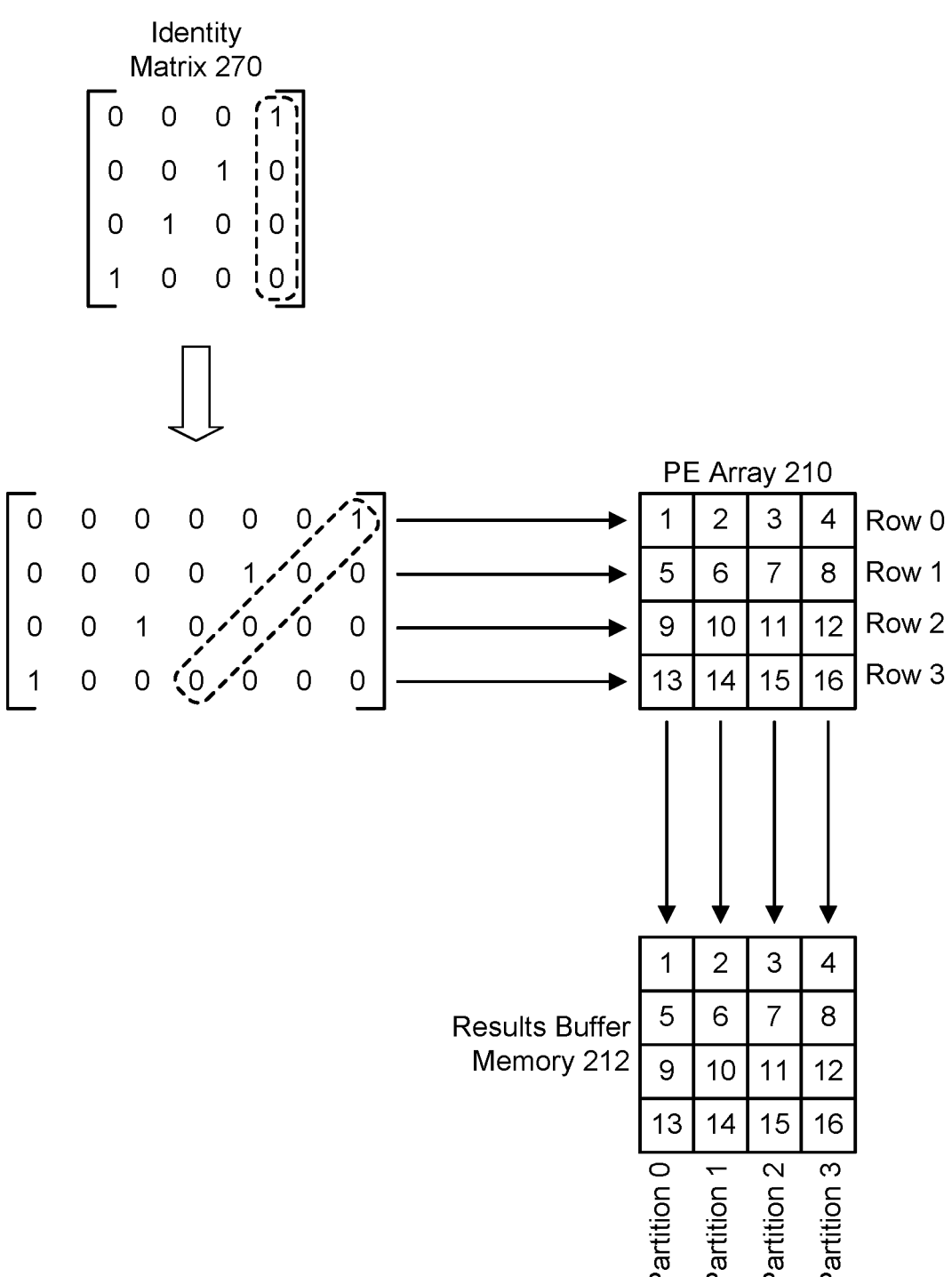
FIG. 2B illustrates a conceptual diagram of an example of additional operations to transpose a tensor.
Figure 2C:
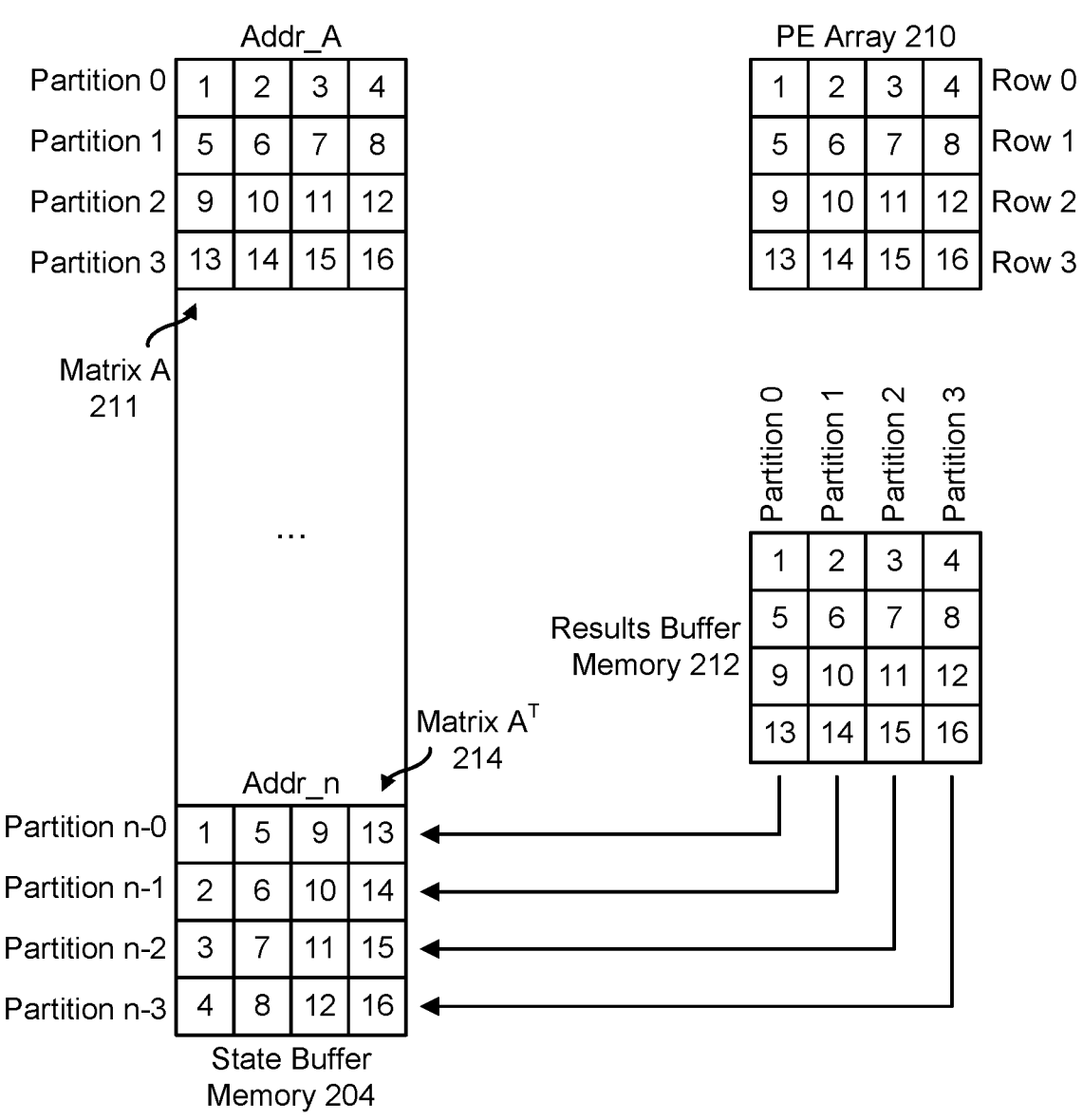
FIG. 2C illustrates a conceptual diagram of an example of further operations to transpose a tensor.

FIGS. 2A-2C illustrate a simplified example of a sequence of operations to transpose a matrix using a computational array (e.g., a processing engine array) as an interconnect. The matrix transpose operation can be performed, for example, by an accelerator such as accelerator 102 in FIG. 1. In FIGS. 2A-2C, an example using a square matrix is illustrated for ease of explanation, however, the matrix transpose operation is not limited to a square matrix. It should be appreciated that while the present example is explained with a 2D matrix, the 2D matrix can be a block or a sub-block of data elements of a larger decomposed multi-dimensional tensor.

Referring to FIG. 2A, data elements of a decomposed tensor forming a 2D 4×4 matrix A 211 can be mapped to locations in a memory such as state buffer 204. The state buffer 204 can be an on-chip memory for the accelerator, and may include additional columns and/or rows not specifically shown. In the example of FIG. 2A, the data elements of matrix A 211 are mapped and stored in partitions 0-3 starting at address Addr_1 of the state buffer 204. Each partition of the state buffer 204 can be a logical portion of the memory that is independent of other portions. In FIG. 2A, each partition of the state buffer 204 can be a row of the state buffer 204 having a number of columns equal to the column dimension of the state buffer 204. By way of example, data elements 1, 2, 3, and 4 of matrix A 211 can be mapped to partition 0 starting at address Addr_1 of the state buffer 204; data elements 5-8 of matrix A 211 can be mapped to partition 1 of the state buffer 204, data elements 9-12 of matrix A 211 may be mapped to partition 2 of the state buffer 204, and data elements 13-16 of matrix A 211 may be mapped to partition 3 of the state buffer 204. The data elements of the decomposed tensor stored in the state buffer 204 can be, for example, weight values, feature map input values, intermediate results, or other data that are used during execution of a neural network model.

The data elements 1-16 of matrix A 211 stored in the state buffer 204 can be loaded into the processing engine (PE) array 210. The PE array 210 can be a systolic array and the data elements 1-16 can be loaded and stored in the weight cache registers of the PE array 210 for further processing. It should be noted that although the data elements are being stored in the weight cache registers of the PE array 210, the data elements themselves need not necessarily be actual weight values because the PE array 210 is being used as an interconnect and not for computations in tis example. Referring to FIG. 2A, the data elements 1-16 can be loaded into the PE array 210 on a data bus that are used for transmitting weight values. An instruction, for example, a load weights instruction, generated by a compiler can cause each of the data elements to be loaded in order into individual processing elements in the PE array 210. The data elements from each partition in the state buffer 204 can be loaded into a corresponding row of the PE array 210. For example, the data elements 1-4 in partition 0 of the state buffer 204 can be loaded into row 0 of the PE array 210, the data elements 5-8 in partition 1 of the state buffer 204 can be loaded into row 1 of the PE array 210, the data elements 9-12 in partition 2 of the state buffer 204 can be loaded into row 2 of the PE array 210, and the data elements 13-16 in partition 3 of the state buffer 210 can be loaded into row 3 of the PE array 210. Thus, the data elements 1-16 of matrix A 211 can be loaded into the PE array 210 in the same row-column format retaining the matrix A 211 structure as they were stored in the state buffer 204, with the data elements in each row of the PE array 210 corresponding to a partition in the state buffer 204.

Referring now to FIG. 2B, after the data elements of matrix A 211 have been loaded and stored into the processing elements of the PE array 210, a matrix multiplication operation can be performed by the array using an identity matrix 270. The matrix multiplication operation can be performed using an element-by-element multiplication of the data elements in a column of the identity matrix 270 and the data elements stored in the weight cache registers in a column of PE array 210, and accumulating (e.g., adding or summing) the multiplications results along a column of PE array 210. In some implementations, the identity matrix 270 can be stored in state buffer 204 and be shifted into the PE array 210 from the state buffer 204. Alternatively, the identity matrix 270 may be constructed by a compiler from a '0' data element and a '1' data element stored in the state buffer 204. The identity matrix 270 may flow into the PE array 210 along a data bus that is used for transmitting feature map input values.

It should be noted that because the PE array 210 perform computations as a diagonal wavefront, the identity matrix 270 is shifted into PE array 210 with a diagonal offset. By way of example, the elements of the rightmost column of the identity matrix highlighted in the dotted outline are arranged diagonally when being shifted into PE array 210, such that the data element in each subsequent row is shifted into PE array 210 one clock cycle after the previous row. As each element of the identity matrix 270 is shifted into PE array 210, that element is multiplied with the data element stored in the weight cache register of the PE array 210 and added to a partial sum input to generate a partial sum output that is provided to the processing element in the subsequent row along the same column of the PE array 210. Each column of identity matrix 270 is shifted into the PE array 210 in a similar manner.

Once the partial sums accumulated by each processing element have flowed down a column, the partial sum outputted from a column is the result of multiplying one column of the identity matrix 270 with one column of the data elements stored in the weight cache registers of PE array 210 (e.g., a dot product of the values). Because each column of the identify matrix 270 has only one element with a value of '1' while the other elements in the column has a '0' value, the output of the column (or the dot product) is equal to the value of the data element in the PE array 270 corresponding to the '1' element in the column of the identity matrix 270.

The process continues with the identity matrix 270 propagating across the PE array 210 until each column of the identity matrix 270 has been multiplied by each column of data elements stored in the weight cache registers in the PE array 210. As each accumulation result is outputted from each column of the PE array 210, the result is stored in results buffer 212. Results buffer 212 may include addition rows and columns not specifically shown. Each partition of the results buffer 212 can be a logical portion of the memory that is independent of other portions. Each partition of the results buffer 212 can be a column of the results buffer 212. Hence, the accumulation result from a column of PE array 210 is stored in a corresponding partition of results buffer 212. Referring to FIG. 2B, performing a matrix multiplication of multiplying matrix A 211 with identity matrix 270 (may also be referred in to as a identity multiplication) in PE array 210 results in a matrix having the same values as matrix A 211 being stored in results buffer 212.

Referring now to FIG. 2C, the data elements accumulated in the column partitions 0-3 of results buffer 212 can be transferred back to the state buffer 204 (e.g., via any of activation engine 116, vector compute engine 117, pooling engine 118 in accelerator 102 of FIG. 1). The accelerator hardware is configured to map the data elements from the column partitions of the results buffer 212 to the row partitions of the state buffer 204. When the data elements in the results buffer 212 are transferred to the state buffer 204, the data elements in the column partitions 0-3 of the results buffer 212 are mapped into respective row partition n-0 to n-3 starting at address Addr_n of the state buffer 204. Thus, row partition n-0 of the state buffer 204 is written with data elements 1, 5, 9, and 13 from column partition 0 of the results buffer 212, row partition n-1 of the state buffer 204 is written with data elements 2, 6, 10, and 14 from column partition 1 of the results buffer 212, row partition 2 of the state buffer 204 is written with data elements 3, 7, 11, and 15 from column partition n-2 of the results buffer 212, and row partition n-3 of the state buffer 204 is written with data elements 4, 8, 12, and 16 from column partition 3 of the results buffer 212. Thus, the matrix A 211 can be remapped into the state buffer 204 as the transposed matrix $A^T$ 214. Transposed matrix $A^T$ 214 can then be shifted into PE array 210 from partitions n-0 to n-3 of state buffer 204 to perform further computations.

Although the example above have been described using a 4×4 matric A 211, the techniques to use the PE array 210 to move data elements of a matrix to different positions (e.g., transpose a matrix) can be extended to matrices of different sizes including rectangular matrices where the number of rows and columns are different from each other. Furthermore, the mapping of specific partitions of state buffer 204 to specific rows of PE array 210, mapping of specific columns of PE array 210 to specific partitions of results buffer 212, and the mapping of specific partitions of results buffer 212 to specific partitions of state buffer 204 are for illustrative purpose, and that the specific partitions, rows, and columns of the various components can be mapped differently in other examples. Accordingly, an example of using PE array 210 as an interconnect to transpose a matrix has been described with refence to FIGS. 2A-2C.

In some scenarios, the data elements of a matrix being manipulated may contain one or more infinity values (e.g., a floating-point value representing negative infinity, a floating-point value representing positive infinity). Using standard floating-point arithmetic, when such an infinity value is being multiple with zero (e.g., a '0' element of an identity matrix), the processing element performing the multiplication may output a not-a-number (NaN) value to indicate that the result is undefined. When the NaN value is flowed along a column, the accumulated result is also a NaN value. Under such a scenario, instead of retaining the original value of the data element in the matrix being transposed, the infinity value will be overwritten with a NaN value. Hence, instead of transposing the data elements of a matrix, some of the data elements can be overwritten with a NaN value.

Figure 3:
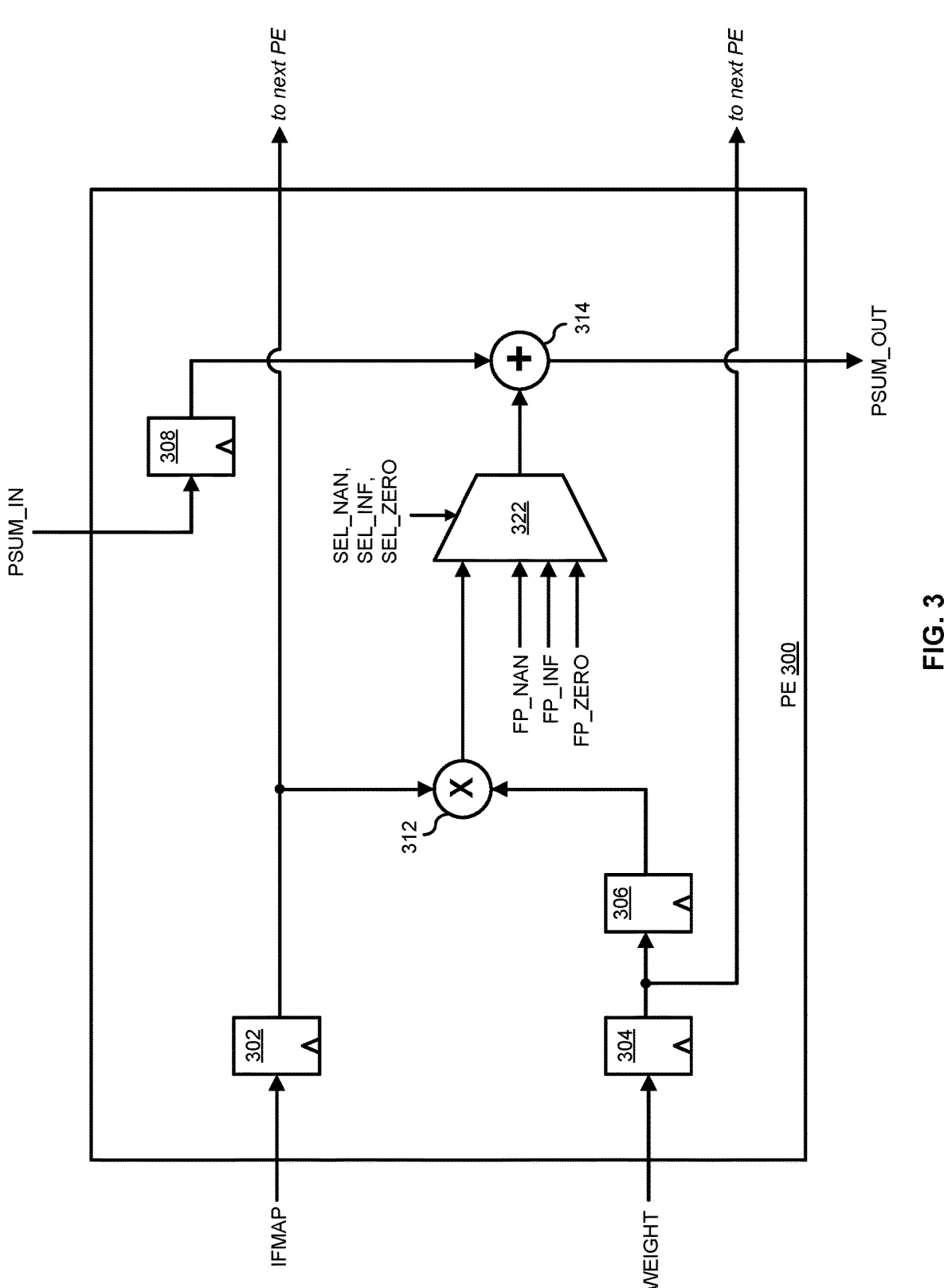
FIG. 3 illustrates a block diagram of an example of a processing element.

FIG. 3 illustrates a block diagram of an example of the circuitry of an integrated circuit device implementing a processing element 300. Processing element 300 can be used, for example, as a processing element of PE array 110 or PE array 210. Processing element 300 has the capability to set a multiplication result to a zero value when multiplying infinity with zero during an interconnect mode of operation (e.g., to perform a transpose operation), and set a multiplication result to a NaN value when multiplying infinity with zero during a compute mode of operation to perform computations.

Processing element 300 includes a feature map register 302 operable to receive data on an input data bus such as a feature map input data bus IFMAP, and a weight register 304 operable to received data on an input data bus such as weight input data bus WEIGHT. Processing element 300 also includes a weight cache register 306 to store data shifted in from weight register 304. Weight cache register 306 allows processing element 300 to retain a value that can be used for multiple cycles of computations. For example, during neural network computations, the same weight tensor can be used to perform computations with multiple sets of feature map input data. In such implementations, a weight value can be preloaded and stored in weight cache register 306 to allow multiple computations for the different sets of feature map input data to be performed with the same weight value stored in weight cache register 306.

Processing element 300 includes a multiplication circuit 312 and an adder circuit 314 coupled to the multiplication circuit 312. Processing element 300 can be configured to perform fused-multiply-accumulate operations. Processing element 300 is operable to generate a multiplication result based on multiplying two multiplication operands using the multiplication circuit 312, and to generate a partial sum output PSUM_OUT based on a partial sum input PSUM_IN using the adder circuit 314. For example, during operation, multiplier circuit 312 can multiply the data element shifted into feature map register 302 with the data element stored in weight cache register 306 to generate a multiplication result. The multiplication results can be provided to adder circuit 314 via a multiplication result selection circuit 322 and be added with the partial sum input PSUM_IN shifted into partial sum input register 308. The addition result can then be outputted as a partial sum output PSUM_OUT to the next processing element along the same column of the PE array.

Multiplication result selection circuit 322 can be implemented, for example, using a multiplexer, and includes a set of inputs that can be selectively provided to adder circuit 314. The set of inputs to multiplication result selection circuit 322 includes the output of the multiplication circuit 312, a not-a-number (NaN) value FP_NAN, an infinity value FP_INF, and a zero value FP_ZERO. The NaN value can be represented in floating-point format as a value having all 1's in the exponent bits and a non-zero value in the mantissa bits; the infinity value can be represented in floating-point format as a value having all 1's in the exponent bits and all 0's in the mantissa bits; and the zero value can be represented with all 0's. Selection of which input to provide to adder circuit 314 is controlled by a set of selection signals including a select NaN signal SEL_NAN (which is asserted to select FP_NAN), a select infinity signal SEL_INF (which is asserted to select FP_INF), and a select zero signal SEL_ZERO (which is asserted to select FP_ZERO). If none of these select signals are asserted, the output from multiplication circuit 312 is selected by default.

Multiplication result selection circuit 322 is operable to select one of the inputs using the set of selection signals depending on the mode of operation and the two multiplication operands (e.g., IFMAP and WEIGHT). For example, in an interconnect mode of operation (e.g., to perform a transpose operation), the multiplication result selection circuit 322 is operable to set the multiplication result provided to adder circuit 314 to a zero value by selecting FP_ZERO in response to the two multiplication operands being zero and infinity. The effect of setting the multiplication result to zero is that the processing element 300 will generate the partial sum output PSUM_OUT to have the same value as the partial sum input PSUM_IN in response to the two multiplication operands being zero and infinity in the interconnect mode of operation. In contrast, in a compute mode of operation to perform computations (e.g., when not performing a transpose operation), the multiplication result selection circuit 322 is operable to set the multiplication result to a not-a-number (NaN) value by selecting FP_NAN in response to the two multiplication operands being zero and infinity. As another example, the multiplication result selection circuit 322 is operable, in the interconnect mode of operation, to set the multiplication result to the zero value by selecting FP_ZERO in response to the two multiplication operands being zero and NaN. In the compute mode of operation, the multiplication result is set to the NaN value by selecting FP_NAN in response to the two multiplication operands being zero and NaN. As a further example, in both the interconnect mode of operation and the compute mode of operation, the multiplication result is set to the infinity value by selecting FP_INF in response to the two multiplication operands being infinity and a non-zero number (a value that is not NaN and not zero). It should be noted that when infinity value is selected because one of the multiplication operands is infinity, the sign of the infinity operand is retained in the output of the multiplication result selection circuit 322.

Figure 4:
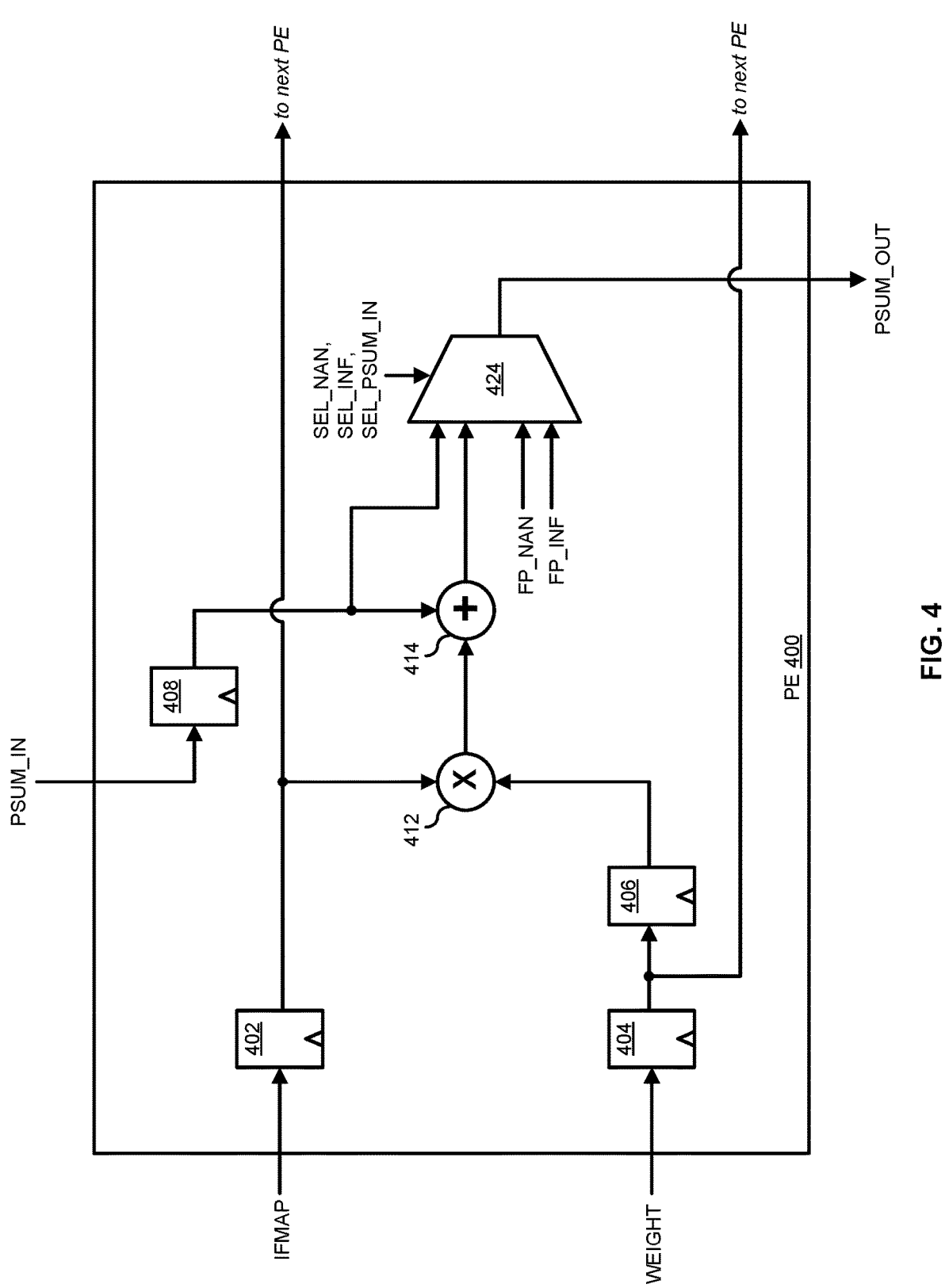
FIG. 4 illustrates a block diagram of another example of a processing element.

FIG. 4 illustrates a block diagram of another example of the circuitry of an integrated circuit device implementing a processing element 400. Processing element 400 can be used, for example, as a processing element of PE array 110 or PE array 210. Similar to processing element 300, processing element 400 has the capability to generate a partial sum output having the same value as the partial sum input in response to the two multiplication operands being zero and infinity when operating in an interconnect mode of operation (e.g., to perform a transpose operation).

Processing element 400 includes a feature map register 402, a weight register 404, a weight cache register 406, a partial sum input register 408, a multiplication circuit 412, and an adder circuit 414. The functions of these components are similar to those of processing element 300, and thus a detailed description of which need not be repeated. Processing element 400 includes an output selection circuit 424 that is used to select an output value for the partial sum output PSUM_OUT of processing element 400.

Output selection circuit 424 can be implemented, for example, using a multiplexer, and includes a set of inputs that can be selectively provided as the partial sum output PSUM_OUT. The set of inputs to output selection circuit 424 includes the output of the adder circuit 414, a not-a-number (NaN) value FP_NAN, an infinity value FP_INF, and the partial sum input from the partial sum input register 408. The NaN value can be represented in floating-point format as a value having all 1's in the exponent bits and a non-zero value in the mantissa bits; and the infinity value can be represented in floating-point format as a value having all 1's in the exponent bits and all 0's in the mantissa bits. Selection of which input to provide to as the partial sum output PSUM_OUT is controlled by a set of selection signals including a select NaN signal SEL_NAN (which is asserted to select FP_NAN), a select infinity signal SEL_INF (which is asserted to select FP_INF), and a select partial sum input signal SEL_PSUM_IN (which is asserted to select the partial sum input). If none of these select signals are asserted, the output from adder circuit 414 is selected by default.

Output selection circuit 424 is operable to select one of the inputs using the set of selection signals depending on the mode of operation and the two multiplication operands (e.g., IFMAP and WEIGHT). For example, in an interconnect mode of operation (e.g., to perform a transpose operation), the output selection circuit 424 is operable to select the partial sum input as the partial sum output in response to the two multiplication operands being zero and infinity. In contrast, in a compute mode of operation to perform computations (e.g., when not performing a transpose operation), the output selection circuit 424 is operable to select the NaN value as the partial sum output in response to the two multiplication operands being zero and infinity. As another example, the output selection circuit 424 is operable, in the interconnect mode of operation, to select the partial sum input as the partial sum output in response to the two multiplication operands being zero and NaN. In the compute mode of operation, the partial sum output is set to the NaN value in response to the two multiplication operands being zero and NaN. As a further example, in both the interconnect mode of operation and the compute mode of operation, the infinity value is selected as the partial sum output in response to the two multiplication operands being infinity and a non-zero number (a value that is not NaN and not zero).

Accordingly, two variations of a processing element with the capability to generate the partial sum output having a same value as the partial sum input when multiplying zero with infinity in an interconnect mode of operation have been described. In some implementations, different logic circuitry can be implemented to perform similar functionalities. For example, three control signals for multiplication result selection circuit 322 or output selection circuit 424 can be encoded into a 2-bit signal to select one of the four inputs for the corresponding selection circuit. In some implementations, if the NaN and infinity selections are built into the multiplication circuit 312, then multiplication result selection circuit 322 may only need to select between the output of the multiplication circuit 312 and the zero value. In some implementations, if the NaN and infinity selections are built into the adder circuit 414, then output selection circuit 424 may only need to select between the output of the adder circuit 414 and the partial sum input.

FIG. 5 illustrates an example of logic circuitry 500 that can be used to implement the selection signals of a multiplication result selection circuit or an output selection circuit. Logic circuitry 500 may include an OR logic circuit 502 to generate a NaN selection signal SEL_NAN, an OR logic circuit 504 to generate a zero selection signal SEL_ZERO or a partial sum input selection signal SEL_PSUM_IN, and an OR logic circuit 506 to generate an infinity selection signal SEL_INF. These selection signals can be used, for example, in processing element 300 and/or processing element 400. Assertion of the select signals are based on the values of the multiplication operands (e.g., feature map input value IFMAP, weight value WEIGHT) being processed and the operating mode of the processing engine array/processing element as indicated by a mode signal XMODE. Mode signal XMODE is asserted when operating in an interconnect mode (e.g., to perform a matrix transpose operation), and is deasserted when operating in a compute mode to perform computations.

Referring to OR logic circuit 502, the NaN selection signal SEL_NAN is asserted when the feature map input value IFMAP is a NaN (as indicated by IFMAP_IS_NAN), and either the weight value is a one (as indicated by WEIGHT_IS_ONE) or the operating mode is not in the interconnect mode (as indicated by the inversion of XMODE). The NaN selection signal SEL_NAN is also asserted when the weight value WEIGHT is a NaN (as indicated by IFMAP_IS_NAN), and either the feature map input value IFMAP is a one (as indicated by IFMAP_I-S_ONE) or the operating mode is not in the interconnect mode (as indicated by the inversion of XMODE). The NaN selection signal SEL_NAN is also asserted when the feature map input value IFMAP is infinity (as indicated by IFMAP_IS_INF), the weight value WEIGHT is zero (as indicated by WEIGHT_IS_ZERO), and the operating mode is not in the interconnect mode (as indicated by the inversion of XMODE). The NaN selection signal SEL_NAN is also asserted when the feature map input value IFMAP is zero (as indicated by IFMAP_IS_ZERO), the weight value WEIGHT is infinity (as indicated by WEIGHT_IS_INF), and the operating mode is not in the interconnect mode (as indicated by the inversion of XMODE).

Referring to OR logic circuit 504, the zero selection signal SEL_ZERO is asserted when the feature map input value IFMAP is zero (as indicated by IFMAP_IS_ZERO), and either the weight value WEIGHT is not a NaN and not infinity (as indicated by WEIGHT_IS_NOT_NAN and WEIGHT_IS_NOT_INF) or the operating mode is in the interconnect mode (as indicated by XMODE). The zero selection signal SEL_ZERO is also asserted when the weight input value WEIGHT is zero (as indicated by WEIGHT_IS_ZERO), and either the feature map input value IFMAP is not a NaN and not infinity (as indicated by IFMAP_IS_NOT_NAN and IFMAP_IS_NOT_INF), or the operating mode is in the interconnect mode (as indicated by XMODE). Logically, the partial sum input selection signal SEL_PSUM_IN is asserted under the same conditions, and the same logic can be used to generate the partial sum input selection signal SEL_PSUM_IN.

Referring to OR logic circuit 506, the infinity selection signal SEL_INF is asserted when the feature map input value IFMAP is infinity (as indicated by IFMAP_IS_INF), the weight value WEIGHT is not a NaN (as indicated by WEIGHT_IS_NOT_NAN), and the weight value WEIGHT is not zero (as indicated by WEIGHT_IS_NOT_ZERO). The infinity selection signal SEL_INF is also asserted when the weight input value WEIGHT is infinity (as indicated by WEIGHT_IS_INF), the feature map input value IFMAP is not a NaN (as indicated by IFMAP_IS_NOT_NAN), and the feature map input value IFMAP is not zero (as indicated by IFMAP_IS_NOT_ZERO).

It should be understood that these logic circuits of circuitry 500 are just examples, and that the selection circuits can be generated using other logic gates or circuitry to perform the same function of asserting the selection signal based on the values of the multiplication operands (e.g., feature map input value IFMAP, weight value WEIGHT) being processed and the operating mode of the processing engine array/processing element (e.g., interconnect mode, compute mode).

FIG. 6 illustrates a flow diagram of an example of a process 600 to perform a transpose operation on a tensor. Process 600 can be performed, for example, by an integrated circuit device such as a neural network processor or other types of accelerators or data processing circuits. The integrated circuit device may include a computational array such as a processing engine array that includes processing elements arranged in rows and columns. The integrated circuit device may also include a first memory such as a state buffer memory to store data or loading into the computational array, and a second memory such as a results buffer memory to store result data outputted from the computational array. The integrated circuit device can operate in a compute mode of operation in which the computational array is used to perform computations such as floating-point calculations for a neural network model, or in an interconnect mode of operation in which the computational array is used to move or transpose data elements representing a tensor.

Process 600 may begin at block 602 by receiving a request to perform a transpose operation on a tensor. The request can be received in the form of executing a set of instructions compiled by a compiler. For example, a compiler may receive a set of operations to be performed by the integrated circuit device. The set of operations may include neural network computations that are performed as part of executing a neural network model. The compiler may determine that the set of operations includes a matrix transpose operation to be performed on a tensor, and generate the set of compiled instructions provided to the integrated circuit device. The integrated circuit device may then execute the set of instructions and determine that the set of instructions is requesting the integrated circuit device to perform a transpose operation. In some implementations, the set of instructions can be embodied in a computer-readable storage medium.

At block 604, in response to receiving the request to perform the transpose operation, a mode signal is asserted to cause a computational array to use a zero value as a result of multiplying zero with infinity. In some implementations, the mode signal may control multiplication result selection circuits in the computational array (e.g., a computational array formed with processing element 300). In some implementations, the mode signal may control partial sum output selection circuits in the computational array (e.g., a computational array formed with processing element 400). The mode signal can be used by the processing elements of the computational array to select between using zero as the result of multiplying zero with infinity in the interconnect mode of operation, and using a NaN value as the result of multiplying zero with infinity in the compute mode of operation.

At block 606, data elements of the tensor to be transposed are loaded from a first memory into the computational array. For example, the first memory can be a state buffer having partitions that are mapped to rows of the computational array. The data elements can be loaded into the computational array on data buses that are used for inputting weight values into the computational array, and the data elements can be stored in weight cache registers of the computational array.

At block 608, an identity multiplication is performed on the data elements loaded into the computational array. The identity multiplication may involve performing a matrix multiplication of the data elements stored in the computational array with an identity matrix that is shifted into the computational array on data buses that are used for inputting feature map input values into the computational array. Each column of the identity matrix is multiplied with a column of data elements stored in the computational array to generate an accumulated value that is outputted along the corresponding column of the computational array. Because each column of the identity matrix has one element with a '1' value and all other values set to '0', the accumulated value that is outputted along the column retains the value of the data element in the column of the computational array corresponding to the element of the identity matrix having the '1' value.

At block 610, the result of the identity multiplication is stored in a second memory. In some implementations, the second memory may have column partitions that are mapped to columns of the computational array. For example, the second memory can be a results buffer. Because the identity multiplication did not change the values of the data elements, the effect of the identity multiplication is to copy the data elements to the second memory.

At block 612, the result of the identity multiplication is loaded from the second memory into the first memory. The column partitions of the second memory (e.g., results buffer) can be mapped to the row partitions of the first memory (e.g., state buffer). As such, by writing the data elements stored in the column partitions of the second memory back to the row partitions of the first memory, the data elements of the tensor will be stored transposed in the first memory. In scenarios in which the tensor is larger than the storage capacity of the computational array, process 600 can be repeated for decomposed portions of the tensor to transpose the tensor.

Upon completing the transpose operation, the integrate circuit device may receive a request to perform a matrix multiplication operation (e.g., to perform a floating-point computation). The request can be received as part of executing a set of instructions. To perform the matric multiplication operation, the mode signal can be deassserted to cause the computational array to use a not-a-number value as the result of multiplying zero with infinity, which is the expected behavior when performing floating-point computations.

It should be understood that the specific steps illustrated in FIG. 6 provide a particular process for performing a transpose operation on data elements of a tensor (e.g., a decomposed block of data elements from the tensor) according to some implementations. Other sequences of steps can be performed in other implementations. For example, alternative implementations may perform the steps outlined above in a different order. Moreover, the individual steps illustrated in FIG. 6 may include multiple sub-steps that may be performed in various sequences as appropriate to the individual step. Furthermore, additional steps may be added, removed, or merged depending on the particular implementation.

Figure 7:
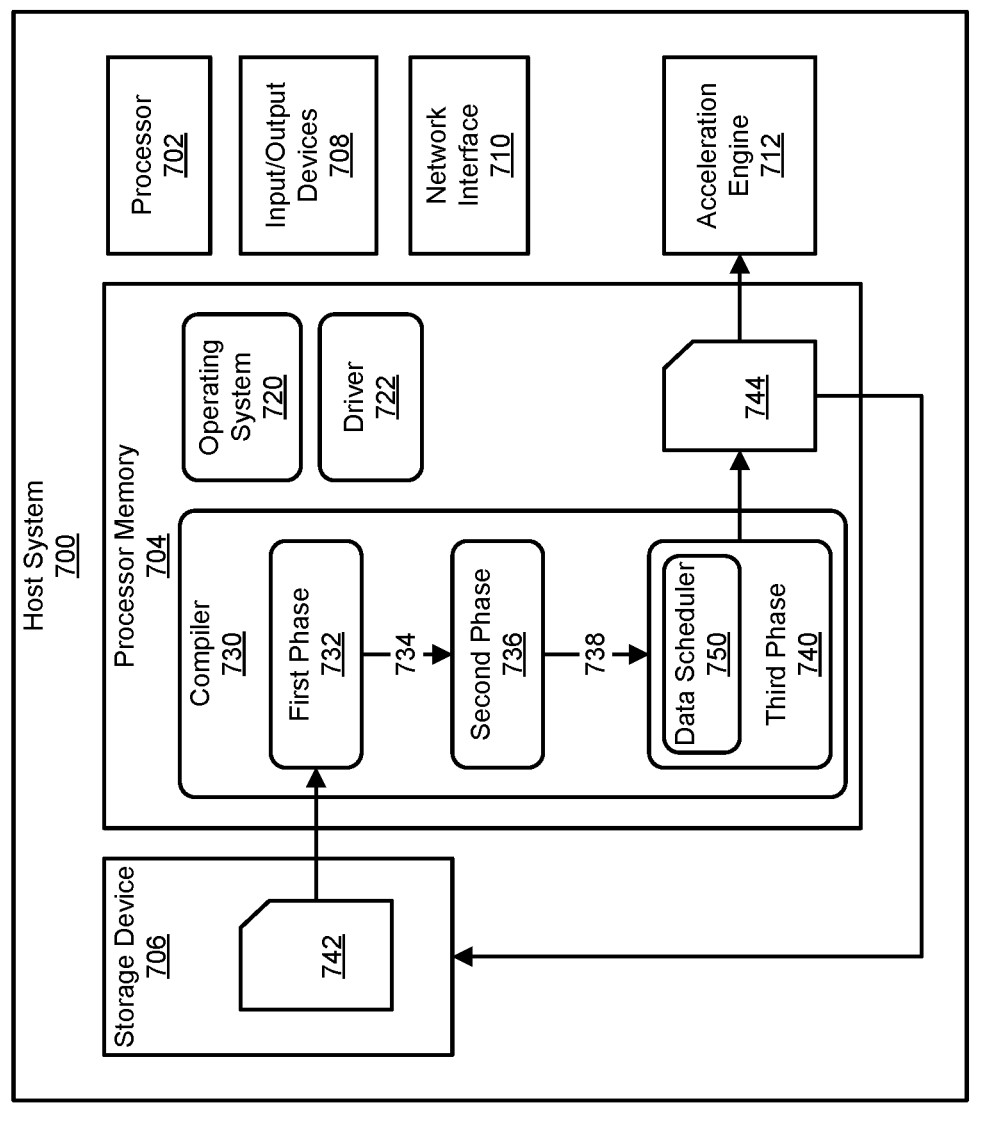
FIG. 7 illustrates a block diagram of an example of a host system having a compiler.

FIG. 7 includes a block diagram illustrating an example of a host system 700 on which a compiler 730, such as is described herein, can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 also includes an acceleration engine 712, which is an integrated circuit device that can accelerate certain operations or computations performed by the host system 700. In various examples, the host system 700 can be implemented as a server in a data center, a desktop computer, a laptop computer, a tablet computer, or a smartphone, among other examples. In some examples, operations or components discussed below as being performed or included in the host system 700 can be performed or included in other computer devices. For example, the compiler 730 can execute on the host system 700 while the acceleration engine 712 is located at a different host system.

The processor 702 is an integrated circuit device that can execute program code, in the form of instructions. The program code can be for various software applications or tools, such as an operating system 720 or the illustrated compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data on which the processor 702 is operating. In various examples, the processor memory 704 is a volatile memory type, such as a type of random access memory, though non-volatile memory types can, alternatively or additionally, be used for the processor memory 104.

The storage device 706 is an example of a device that can include non-volatile memory. For example, the storage device 706 can be a magnetic disk drive, a solid-state drive, or an optical drive, among other examples. The storage device 706 can further be non-transitory, such that program code and other data stored on the storage device 706 remains present when the storage device 106 is not powered on.

The storage device 706 is one example of a peripheral device, which are components that can be coupled to the host system 700 to add functionality to the host system 700. Other examples of peripheral devices include the Input/Output devices 708 and the network interface 710. The Input/Output devices 708 can include user input and output devices, such as keyboards, mice, touch screens, microphones, display screens, speakers, printers, and scanners, among other examples. The network interface 710, which can be implemented using a network interface card, can provide access to one or more networks. The network interface 710 can include, for example, a physical port for connecting a network cable and/or wireless antennas for communicating with Wi-Fi and/or cellular networks. The network interface 710 can also be described as an I/O device.

The acceleration engine 712 is also another type of peripheral device or I/O device. The acceleration engine 712 is a device that is purpose-built to perform certain operations that can be performed by the processor 702, but can be performed faster by the acceleration engine 712. For example, the acceleration engine 712 can be a neural network accelerator, and, as such, may be able to perform the large scale, parallel computations of a neural network more efficiently than when the computations are performed by the processor 702. As another example, the acceleration engine 712 can be a graphics processing unit (GPU), and may be optimized to perform the computations needed for graphics rendering. Other examples of devices that can be implemented by the acceleration engine 712 include cryptographic accelerators, compression and decompression accelerators, 3-D accelerators, regular expression accelerators, security accelerators, and others.

In various examples, the acceleration engine 712 can execute program code to perform certain operations. For example, when the acceleration engine 712 is a neural network accelerator, the acceleration engine 712 can be programmed to execute a particular neural network, such as one that performs image recognition or one that performs machine translation. As a further example, to support the execution of a neural network, the acceleration engine 712 can be programed to perform operations such as copying data for the neural network from processor memory 704 (for example) into the acceleration engine 712, copying input data for the neural network from processor memory 704 into the acceleration engine 712, and/or copying results from the acceleration engine 712 into the processor memory 704, among other examples.

To generate program code for the acceleration engine 712, in various examples, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 712 is a neural network accelerator and the compiler 730 is for compiling a neural network description into instructions to be executed by the acceleration engine 712. When the acceleration engine 712 implements a different type of accelerator, another compiler can be used.

The compiler 730 can be activated, for example, when the operating system 720 receives keyboard, mouse, touchscreen, voice commands, or other inputs from the Input/Output devices 708. The inputs can further include parameters for the compiler 730, such as the input code 742 to compile and configuration options for the compilation process. Once the compiler 730 is activated, the processor 702 can load the instructions for the compiler 730 into the processor memory 704, and can execute the instructions.

In the example of FIG. 7, the compiler 730 includes a first stage 732, a second stage 736, and a third stage 740, which each perform different operations to produce compiled code 744. In other examples, the compiler 730 can combine the operations of the first stage 732, second stage 736, and/or third stage 740 into fewer stages, or can divide the operations of one of the stages into multiple stages.

The first stage 732 can receive and process input code 742. The input code 742 can describe a program in a high-level programming language, such as Java, C++, or Tensorflow, among many other examples. The input code 742 can describe, for example, steps to perform image recognition, speech recognition, machine translation, or other operations. The input code 742 can be obtained, for example, from the storage device 706. Alternatively, though not illustrated here, the input code 742 may be located in the processor memory 704 or can be obtained from a network location, using the network interface 710. Processing of the input code 742 can include sorting the operations described in the input code 742 into layers, where the outputs of one layer provide the inputs to a next layer. Processing can also include identifying steps to be performed by the processor 702, rather than by the acceleration engine 712. For example, the processor 702, through the execution of a driver 722, may need to perform steps such as configuring Direct Memory Access (DMA) descriptors for moving data into or out of the acceleration engine 712, among other examples.

The output 734 of the first stage 732 can be organized, for example, in the layers, nodes, and connections between nodes of a neural network. The second stage 736 can perform intermediate processing on this output 734. For example, the operations performed in any one layer, or at any one node in a layer, may be too many for the acceleration engine 712 to perform at the same time. The acceleration engine 712 may, for example, have a limited amount of locale storage space for the data needed for a computation, or the computations may be more than the acceleration engine 712 can perform at one time. In this example, the first stage 732 can break the operations of the layer or node down into smaller operations, which can fit into the acceleration engine's local memory and/or can fit into the computing capacity of the acceleration engine 712. Processing of the output 734 of the first stage 732 can include other steps, such as scheduling, or determining the order in which the acceleration engine 712 and/or processor 702 will perform operations, among other examples.

In various examples, the output 738 of the second stage 736 includes the various steps to be performed by components of the acceleration engine 712, in the order that the steps are to be performed. The output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 740 can operate on the output 738 of the second stage 736, and perform various steps before producing the instructions that are to be executed by the acceleration engine 712. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 740 can include a data scheduler 750 to determine the order in which instructions are executed by the acceleration engine 712.

The output of the third stage 740 is compiled code 744, which may include machine instructions in binary format. In some examples, the compiled code 744 can be stored in the processor memory 104. Alternatively or additionally, the compiled code 744 can be copied to the storage device 706 or to a network location. As noted above, the acceleration engine 712 may be located at a different host system, in which case the compiled code 744 can be sent over the network interface 710 to the other host system.

In the example of FIG. 7, the host system 700 can be executing a driver 722, which can also be referred to as a device driver or runtime driver, that manages the acceleration engine 712. The driver 722 can provide an interface between applications executing on the host system 700 (or on another host system) and the acceleration engine 712. For example, the driver 722 can provide an Application Program Interface (API) that defines functions for feeding input data to the acceleration engine 712 and defining the operation to perform on the input data. In this and other examples, the driver 722 can configure the acceleration engine 712 to perform the operation. For example, the driver 722 can identify a neural network that the acceleration engine 712 is to execute, as well as the location in the processor memory 704 or on the storage device 706 where the compiled code 744 for the neural network is located. The driver 722 can further load into the acceleration engine 712 or cause the acceleration engine 712 to load the compiled code 744, can load or cause the acceleration engine 712 to load the input data on which the neural network is to operate, and/or can cause the acceleration engine 712 to being executing on the input data. Once the acceleration engine 712 has finished, the acceleration engine 712 can notify the driver 722, and the driver 722 can deliver a result back to the application that requested the result.

Figure 8:
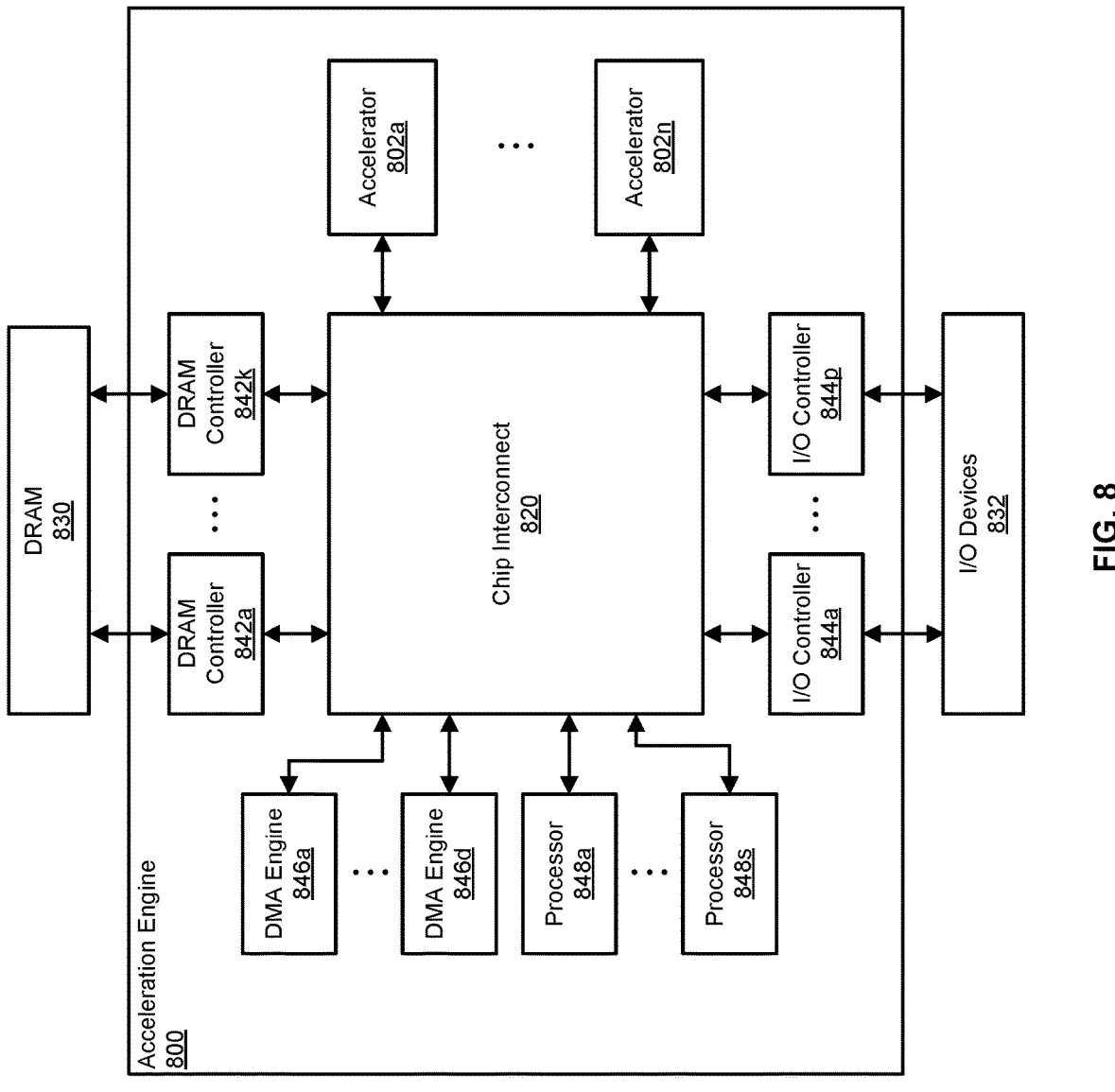
FIG. 8 illustrates a block diagram of an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 1.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general-purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the accelerators 802a-802n is a graphics accelerator) or can be different (e.g., the accelerators 802a-802n include a graphics accelerator, a floating-point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d that can move data between the accelerators 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
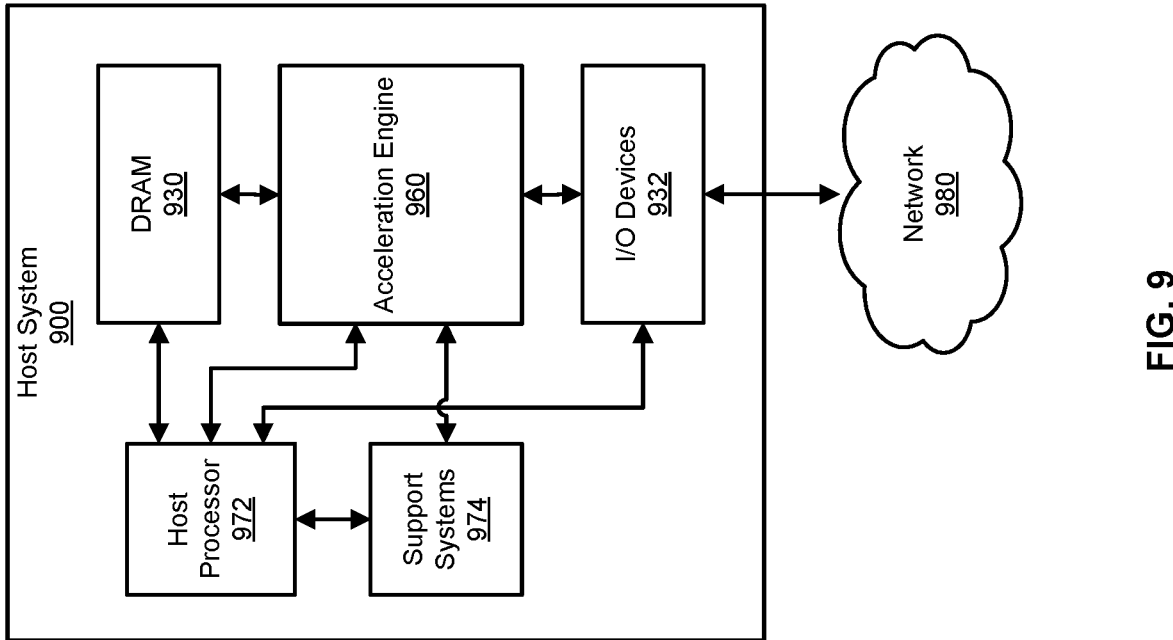
FIG. 9 illustrates a block diagram of another example of a host system.

FIG. 9 includes a block diagram that illustrates an example of a host system 900 in which an acceleration engine 960 can be used. The acceleration engine 960 of FIG. 9 is an example of a device that can include one or more accelerators such as is illustrated in FIG. 7. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general-purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network processor comprising:

a state buffer memory;

a results buffer memory; and a processing engine array having a plurality of processing elements, wherein the neural network processor is operable to execute a set of instructions to perform a transpose operation to transpose a tensor, wherein the transpose operation includes:

loading data elements of the tensor from the state buffer memory into the processing engine array;

performing a matrix multiplication on the data elements loaded in the processing engine array with an identity matrix to generate a set of outputs; and storing the set of outputs in the results buffer memory, and wherein the processing engine array is configured to set a multiplication result to a zero value for the transpose operation in response to multiplying a data element representing infinity stored in the processing engine array with an element of zero from the identity matrix, and wherein each processing element of the processing engine array includes a multiplication result selection circuit operable to select the multiplication result from a plurality of values including the zero value, a NaN value, and an infinity value.

2. The neural network processor of claim 1, wherein the data elements of the tensor are loaded from row partitions of the state buffer memory into corresponding rows of processing elements of the processing engine array, and the set of outputs are stored in column partitions of the results buffer memory, wherein the column partitions in the results buffer memory are mapped to the row partitions in the state buffer memory.

3. The neural network processor of claim 1, wherein the multiplication result selection circuit is operable to select the NaN value as a result of multiplying infinity with zero when the processing engine array is not performing a transpose operation.

4. The neural network processor of claim 1, wherein the multiplication result selection circuit is operable to select an infinity value as a result of multiplying infinity with a non-zero number.

5. An integrated circuit device comprising:
a processing element including a multiplication circuit and an adder circuit coupled to the multiplication circuit,
wherein the processing element is operable to generate a multiplication result based on multiplying two multiplication operands using the multiplication circuit, and to generate a partial sum output based on a partial sum input using the adder circuit,
wherein in an interconnect mode of operation, the processing element is operable to generate the partial sum output having a same value as the partial sum input in response to the two multiplication operands being zero and infinity,
wherein the processing element further comprises a multiplication result selection circuit that is operable, in the interconnect mode of operation, to set the multiplication result to a zero value in response to the two multiplication operands being zero and infinity, and
wherein the multiplication result selection circuit is operable in a compute mode of operation, to set the multiplication result to a not-a-number (NaN) value in response to the two multiplication operands being zero and infinity.

6. The integrated circuit device of claim 5, wherein the multiplication result selection circuit is operable, in the interconnect mode of operation, to set the multiplication result to the zero value in response to the two multiplication operands being zero and NaN.

7. The integrated circuit device of claim 5, wherein the processing element further comprises an output selection circuit that is operable, in the interconnect mode of operation, to select the partial sum input as the partial sum output in response to the two multiplication operands being zero and infinity.

8. The integrated circuit device of claim 7, wherein the output selection circuit is operable, in a compute mode of operation, to select a not-a-number (NaN) value as the partial sum output in response to the two multiplication operands being zero and infinity.

9. The integrated circuit device of claim 5, wherein the processing element is part of an array of processing elements, and wherein the interconnect mode of operation is used to perform a matrix transpose operation using the array of processing elements.

10. The integrated circuit device of claim 9, wherein the matrix transpose operation includes multiplying an input matrix with an identity matrix.

11. The integrated circuit device of claim 10, wherein the matrix transpose operation includes preloading the input matrix into weight cache registers of the array, and subsequently shifting the identity matrix into feature map registers of the array.

12. The integrated circuit device of claim 5, wherein the processing element is operable to dynamically switch between the interconnect mode of operation and a compute mode of operation based on an instruction being executed by the integrated circuit device.

13. A method comprising:
receiving a request to perform a transpose operation on a tensor;
in response to receiving the request to perform the transpose operation, asserting a mode signal to cause a computational array to use a zero value as a result of multiplying zero with infinity;
loading data elements of the tensor from a first memory into the computational array;
performing an identity multiplication on the data elements loaded into the computational array, wherein performing the identity multiplication includes shifting an identity matrix into the computational array on feature map input buses;
storing a result of the identity multiplication in a second memory; and
loading the result from the second memory into the first memory.

14. The method of claim 13, further comprising:
receiving a request to perform a matrix multiplication operation; and
deasserting the mode signal to cause the computational array to use a not-a-number value as a result of multiplying zero with infinity.

15. The method of claim 14, wherein the mode signal controls multiplication result selection circuits in the computational array.

16. The method of claim 14, wherein the mode signal controls partial sum output selection circuits in the computational array.

17. The method of claim 14, wherein the data elements of the tensor loaded into the computational array are stored in weight cache registers of the computational array.

18. A non-transitory computer-readable medium storing instructions that, when executed by one or more processors, cause the one or more processors to execute a compiler, the compiler performing operations including:
receiving a set of operations to be performed by an execution engine having a computational array;
determining that the set of operations includes a matrix transpose operation to be performed on a tensor; and
generating a set of compiled instructions operable to transpose the tensor by:
asserting a mode signal to cause the computational array to use a zero value as a result of multiplying zero with infinity;
loading data elements of the tensor from a first memory into the computational array;
performing an identity multiplication on the data elements loaded into the computational array, wherein performing the identity multiplication includes shifting an identity matrix into the computational array on feature map input buses;

storing a result of the identity multiplication in a second
memory; and loading the result from the second memory into the first
memory.

* * * * *